United States Patent [19]

Ishimaru

[11] Patent Number: 5,223,208
[45] Date of Patent: Jun. 29, 1993

[54] NUCLEAR POWER GENERATION SYSTEM AND ITS CONSTRUCTION METHOD

[76] Inventor: Moritaka Ishimaru, 14-1, Narita-nishi 2-chome, Suginami-ku, Tokyo 166, Japan

[21] Appl. No.: 651,420
[22] PCT Filed: Aug. 14, 1990
[86] PCT No.: PCT/JP90/01035
   § 371 Date: Feb. 8, 1991
   § 102(e) Date: Feb. 8, 1991
[87] PCT Pub. No.: WO92/03828
   PCT Pub. Date: Mar. 5, 1992

[51] Int. Cl.$^5$ ............................................. G21C 13/00
[52] U.S. Cl. ...................................... 376/273; 376/298
[58] Field of Search ............................. 376/273–276, 376/298, 299, 260

[56] References Cited

U.S. PATENT DOCUMENTS

| | | | |
|---|---|---|---|
| 3,712,851 | 1/1973 | Isberg et al. | 376/273 |
| 4,244,153 | 1/1981 | Schwarzer et al. | 376/273 |
| 5,013,519 | 5/1991 | Nakamura et al. | 376/273 |

FOREIGN PATENT DOCUMENTS

| | | |
|---|---|---|
| 2386105 | 10/1978 | France . |
| 60-98394 | 6/1985 | Japan . |
| 62-86205 | 4/1987 | Japan . |
| 64-28592 | 1/1989 | Japan . |
| 1223707 | 9/1989 | Japan . |

OTHER PUBLICATIONS

European Patent Office, Patent Abstracts of Japan, Publication No. JP1223707, Kato Tadashi, "Superconduction Type Power Storage System", Dec. 1989.
European Patent Office, Patent Abstracts of Japan, Publication No. JP3053196, Ishimaru Moritaka, "Atomic Power Generation Systems and Its Constructing Method", Mar. 1991.

Primary Examiner—Daniel D. Wasil
Attorney, Agent, or Firm—Spencer, Frank & Schneider

[57] ABSTRACT

Groundwater running below the surface is intercepted with a cutoff wall of a predetermined height and length to form an underground dam, and a nuclear power generation system is built below said underground dam. The water pooled in the underground dam is utilized as the secondary cooling water for the reactor of the power system.

2 Claims, 3 Drawing Sheets

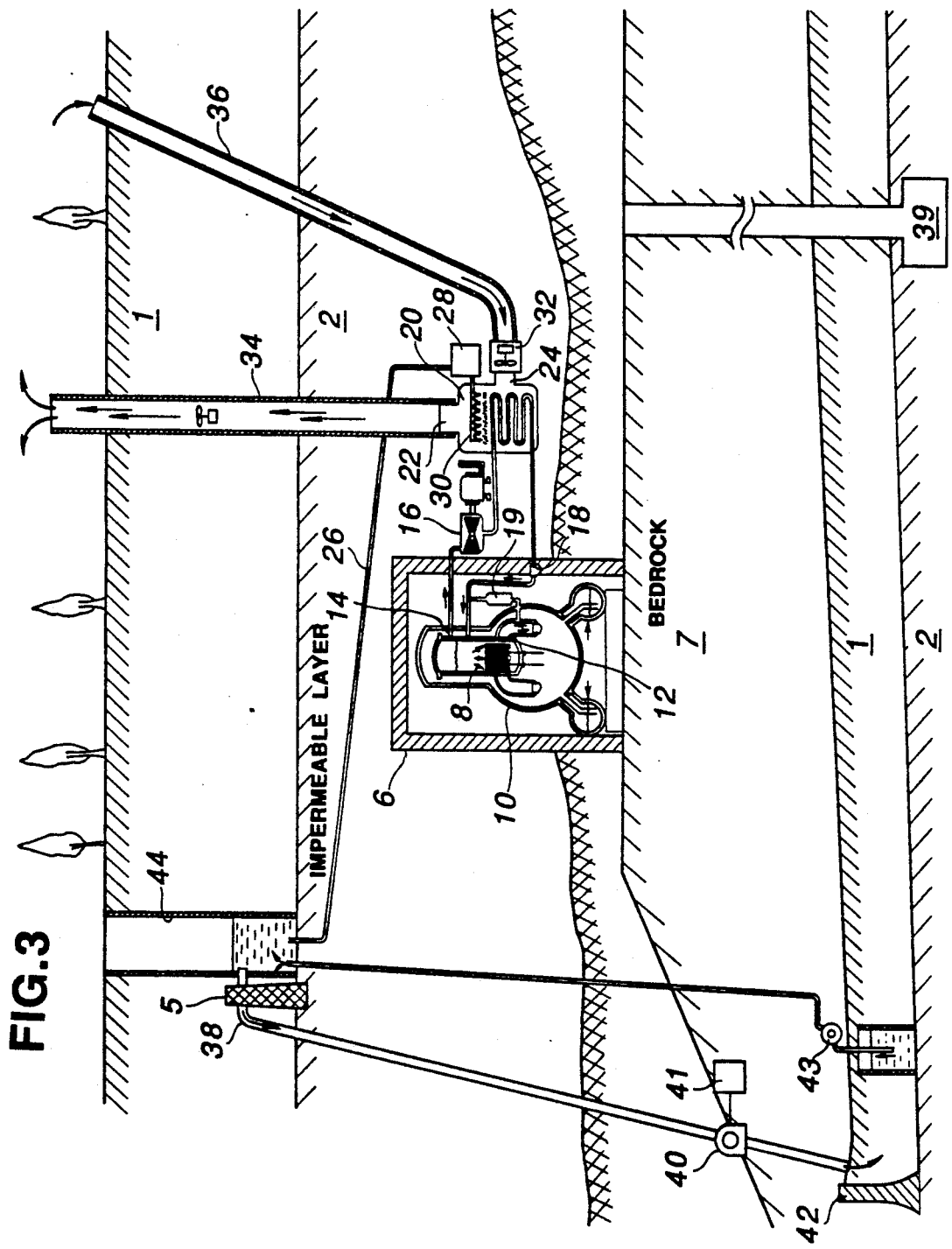

NUCLEAR POWER GENERATION SYSTEM AND ITS CONSTRUCTION METHOD

TECHNICAL FIELD

The present invention relates to a nuclear power generation system which utilizes a dam constructed underground.

TECHNICAL BACKGROUND

Geological formations contain permeable and impermeable layers. These permeable and impermeable layers are frequently faulted, forming number of geological structures where groundwater is pooled (groundwater basin). This means that 40% of precipitation is soaked by the ground, infiltrates into the permeable layers and pools above the impermeable layers before flowing down into the seas. However, flow of the groundwater is restricted by numerous faults in the formations, and is forced to flow along the fault-lines.

Permeable layers are generally 20-45% in porosity and are therefore capable of retaining a large quantity of water (10-20% of the volume of the formations).

In 1979, a cutoff wall measuring 500 m in length and 16.5 m in height was constructed near the outlet of a groundwater basin in Okinawa and used as an underground dam with the storage capacity of 700,000 tons. Subsequently, a number of underground dams were constructed as listed in the table below.

TABLE 1

| name | cutoff wall length (m) | cutoff wall height (m) | storage capacity (water intake) in tons | location |
|---|---|---|---|---|
| Sunagawa | 1,835 | 49 | 9,500,000 | Okinawa |
| Fukusato | 1,720 | 52 | 10,500,000 | Okinawa |
| Minafuku | 500 | 16.5 | 700,000 | Okinawa |
| Kabashima | 59 | 17 | 10,000 | Nagasaki |
| Usami | 129 | 12.5 | 1,000/day | Fukuoka |
| Unknown | 3,850 | 84 | 100,000,000 | China |
| Unknown | 820 | 24 | 700,000 | Taiwan |

These dams are intended to supply drinking water or irrigation water. Amount of intake per day is approximately 250 m$^3$ which is equivalent to 1/40 of the total storage capacity at Kabashima.

In the conventional nuclear power generation systems employed in Japan, uranium oxide is enriched to approximately 3% either in BWR (boiling water reactor) or PWR (pressurized water reactor) and used as a fuel to generate high temperature water steam, which in turn is used to actuate turbines of the generator. The systems are installed on the surface.

Generally, nuclear power generation requires 1.5 million Kw of energy to obtain an output of 500,000 Kw, and of that total energy, 500,000 Kw is converted into electric energy while the rest takes the form of thermal energy. Primary cooling water is used as a moderator for the neutrons generated from a reactor. The primary cooling water is also circulated in the core to remove the heat generated at the core. Heat-laden primary cooling water is exchanged thermally with the secondary coolant of sea water by means of the condenser and recycled into the core. A power generator with the output of 500,000 Kw requires 180,000 m$^3$/h of the sea water as the secondary coolant, which amounts to as much as to 4.32 million m$^3$/day. The temperature of the secondary coolant usually rises by about 7° C. and the water is discharged into the sea. Thus, the energy absorbed by the sea water is calculated as follows:

$$Q_1 = 432 \times 10^{10} \times 7 \text{ cal/day} = 1.46 \text{ million Kw/sec}$$

In the conventional nuclear power generation system, an extremely large amount of secondary cooling water is discharged into the sea. Further, since the cooling water is not designed to be discharged at a distant offshore, the sea water is warmed up and various abnormal events such as red tide and outbreak of jelly fish have occurred.

Another problem is that as the sea water contains much salt, various parts of the generation system such as the water intake port, condenser and pipes become easily eroded.

Nuclear power plants are generally sited at locations where earthquakes are unlikely to occur. However, since the existing plants are constructed on the surface, essential structures such as reactor are easily subjected to strains due to earthquakes if and when they occur.

Although power plants are preferably sited near urban areas where the demand for power is high, nuclear power plants are usually located in remote areas and are therefore inefficient in terms of energy utilization.

Use of sea water as the secondary coolant is further defective in that it requires an energy $E_1 = 200 \times 9.8 \times 10 = 18,000$ Kw to pump up the sea water to the reactor, for example, located at the altitude of 10 m at the rate of 200 m$^3$ per second. Still another defect lies in that it is difficult to site a nuclear power plant at a location where the tide is high.

In view of defects mentioned above in respect of the prior art, the present invention aims at providing an underground nuclear power generation system which is less susceptible to adverse effects of earthquakes, which does not use the sea water, and which can be sited at a location relatively near the urban areas.

DISCLOSURE OF THE INVENTION

The object of the present invention is attained by a nuclear power plant system which comprises underground dams constructed by installing cutoff walls on the groundwater basin, a reactor installed inside concrete walls on a bedrock below the underground dams, and an evaporation type cooling tower connected at one end with the primary coolant for said reactor and at the other end with an intake pipe for the water pooled in said underground dams, wherein a steam exhaust port and an air intake port of said cooling tower are respectively communicated with the surface via stacks.

Above mentioned nuclear power generation system is constructed by the method shown below.

A groundwater basin having suitable condition is detected by a geological survey.

A cutoff wall of predetermined height and length is installed substantially vertically to faults by injecting concrete, water glass (sodium silicate) or the like into the ground near the outlet of a groundwater basin. Then, a reactor is installed on the bedrock below the underground dam and shielded with concrete walls.

An evaporation type cooling tower is installed next to the reactor. An evaporation port and an air inlet port of said cooling tower communicates with the surface via stacks.

The primary cooling water of the reactor and the water pooled in the underground dam are guided into the cooling tower. All the dam water which has been used as coolant is designed to evaporate instead of being returned to the underground.

The storage capacity of the underground dam is designed according to the output of the nuclear power plant. In the case of evaporation type cooling towers, capacity of 2,016 m³/h is required for the output of 500,000 Kw/h, which is equivalent to 48.384 m³ of water per day. Therefore, the total storage capacity is designed at the level more than 5 million m³ or an amount 100 times the daily requirement.

BRIEF DESCRIPTION O THE DRAWINGS

FIG. 3 is a schematic cross section of an embodiment of this invention system.

OPTIMAL MODE TO REALIZE THE INVENTION

This invention will now be described in more detail referring to the attached drawings.

Figure 1:
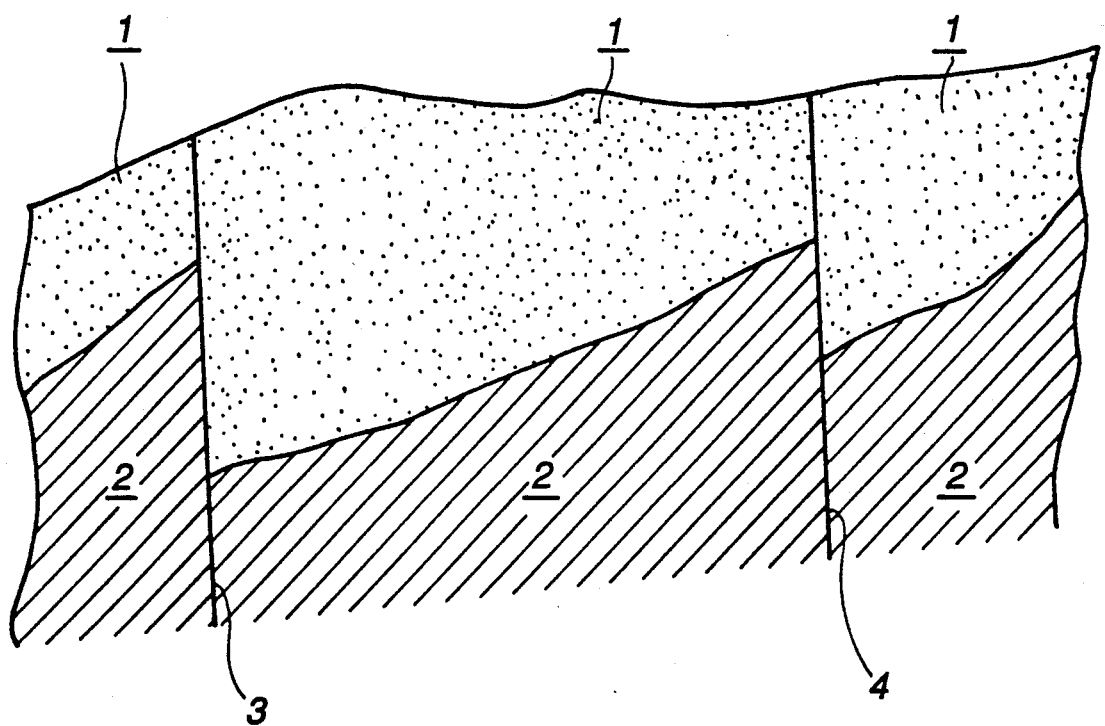
FIG. 1 is a section of formations to show the relation between permeable and impermeable layers.
Figure 2:
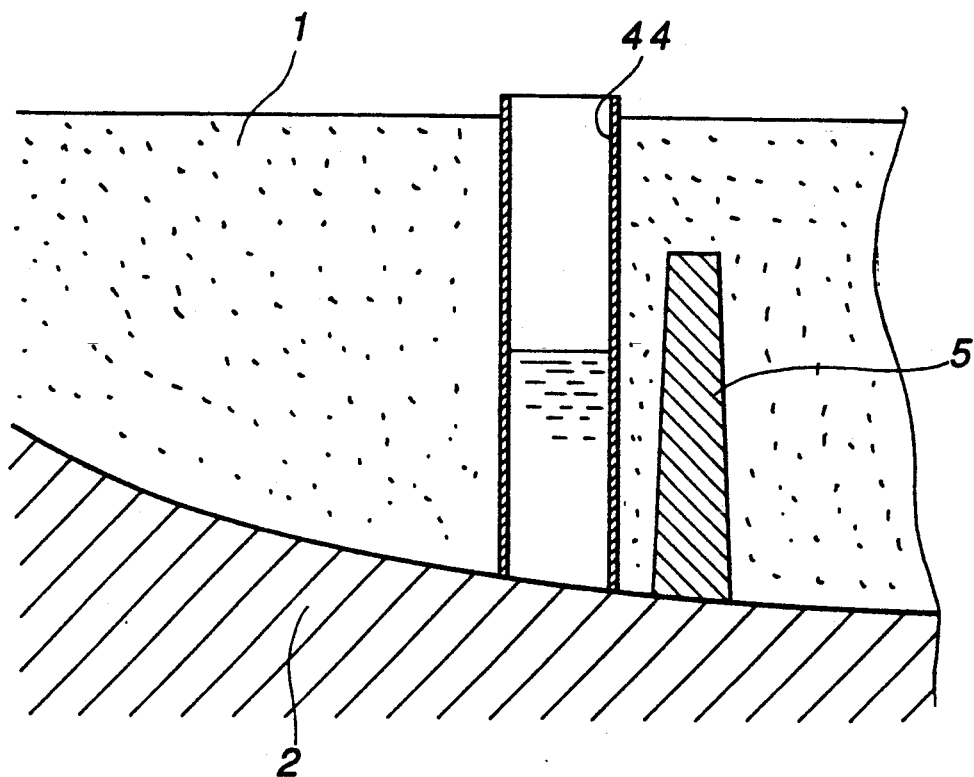
FIG. 2 is a section of an underground dam.

FIG. 1 is a schematic section of formations which mainly comprise permeable layers 1 and impermeable layers 2 which are faulted at fault-lines 3,4. The water is retained in the permeable layers 1, and flows along the impermeable layers 2 which forms the groundwater basin. As shown in FIGS. 1 and 2, a cutoff wall 5 is installed substantially vertical to the line of stratigraphic division of an impermeable layer.

The cutoff wall 5 is built by driving a certain number of pipes into the ground, pouring in through the pipes cement grout which is a mixture of cement and water or a mixture of such cement grout and clay or water glass (sodium silicate) to fill up pores in the permeable layer.

The reference numeral 6 denotes a concrete shield for biological shielding of a reactor installed on a bedrock 7 below the cutoff wall 5. A metal container 10 is placed within said concrete shielding 6, and further inside said container 10 is installed a reactor 8 which generates heat by the reaction of uranium oxide.

The reactor 8 is provided with an inlet 12 for the primary cooling water for cooling the heat generated by the nuclear reaction and an outlet 14 for exhausting the primary cooling water evaporated by the heat from the reactor 8 so as to prevent the reactor 8 from being excessively heated.

The steam let out from said outlet 14 of the reactor 8 is guided to a turbine 16 for generating power via piping means to actuate the turbine 16 for generation of power. It is subsequently exhausted from the turbine 16, condensed at a cooling tower 20 from gas to liquid, and recycled back to the reactor 8 via a water supply pump 18 and a cleaning apparatus 19.

The primary cooling water is designed to circulate within a closed circuit as it is exposed to radiation in the reactor 8.

The cooling tower 20, as shown in FIG. 3, has an air outlet port 22 at the top and an air inlet port 24 on one side thereof, and contains a spiral piping member comprising a thermally conductive tube to form a passage for the primary cooling water. A sprinkler 30 is provided above the piping member in order to sprinkle the water guided from the cutoff wall 5 via a pipe 26 and a tank 28. Further, a large-size fan 32 is installed near the air inlet port 24 for taking in the air from the surface as well as for exhausting the steam at the surface.

This evaporation type cooling tower 20 is intended to absorb the energy of the primary cooling water in the form of heat by utilizing latent heat of the evaporating water, and is capable of absorbing a large amount of energy with less secondary cooling water.

The reference number 34 denotes a stack which is connected to the air outlet port of the cooling tower 20 for letting out the steam to the surface, and 36 a stack connected to the air inlet port 24.

The diameter of those stacks can be determined in relation to the output of the reactor 8, the amount of cooling water and the amount of air blowing, but is preferably relatively large.

In FIG. 3, the reference numeral 38 denotes an overflow pipe which discharges overflow of the water caused by the difference between the amount of water seeping in the underground dam above the cutoff wall and the amount of water taken therefrom. Said overflow pipe is used to activate a turbine 40 of a hydrogenerator 41 for power generation which is installed 30–50 m below the water level of the dam.

The water used for hydropower generation is discharged into a second underground dam formed with a cutoff wall 42 built in the groundwater basin located below said underground dam. The water of the second underground dam is pumped up to the first dam by a pump 43. The water is pumped up during the night by excess of the generated power. The second dam is designed to supply secondary cooling water by pumping up the water when the pondage of the first dam decreases to a level below the requirement.

A water intake pipe 26 and an overflow pipe 38 for the secondary cooling water open into a water well 44 sunken near the cutoff wall 5 of the upper underground dam. Although a second dam is installed underground in this embodiment, the invention is not limited as such. Overflow of the water may be forced into the groundwater vein in the permeable layer.

The reference numeral 39 denotes a repository for spent fuel installed 1,000 m or more below the surface.

The amount of secondary cooling water necessary for an evaporation type cooling tower for the output of 500,000 Kw nuclear power generation is 33.6 m³ per minute loss, the heat $Q_2$ necessary for the water of 15° C. to evaporate in one day is calculated as below.

$$Q_2 = 85° C. \times 48,384 \text{ m}^3 \times 10^6 + 539 \times 48,384 \text{ m}^3 \times 10^6$$
$$= 3.02 \times 10^{13} \text{ cal/day}$$
$$= 1,460,00 \text{ Kw/sec.}$$

As the blown-in air is heated, thermal energy is further absorbed.

The evaporation type cooling tower evaporates 30% of the secondary cooling water for cooling and uses 70% thereof for cooling in the form of liquid.

The output of the underground nuclear power plant can be calculated from the total pondage of the groundwater, the volume of seepage and the necessary amount of water. It is preferable to set the total pondage at a level higher than necessary for safety consideration.

Table 2 shows the amount of secondary cooling water required for the evaporation type cooling tower as relative to the required pondage of the underground dam at the outputs of 100,000, 500,000 and one million Kw.

TABLE 2

| output Kw | amount of water required m³ per min. | amount of water required m³ per day | total pondage required m³ |
| --- | --- | --- | --- |
| 100,000 | 6.7 | 9,677 | 970,000 |
| 500,000 | 33.6 | 48,384 | 4,830,000 |
| 1,000,000 | 67.2 | 96,768 | 9,670,000 |

Required pondage is estimated as 100 times of the amount of daily intake, and the figures are obtained from formula above.

If the output of the nuclear power generation is 500,000 Kw, and the amount of water seeping into an underground dam is normally 96,768 m³ per day, the hydroelectric output Q obtained by the use of this excess water would theoretically be calculated as follows:

$$Q = 9.8 \times 0.56 \, m^3/s \times 40 \, m \, (head) = 219 \, Kw.$$

Although in this embodiment, the overflow of the water in the underground dam is used for hydroelectric generation, use of excess groundwater is not limited to power generation but may be for irrigation for plants on the surface by pumping up the water. The plants may be used as indicator for acid rain measurement.

INDUSTRIAL APPLICABILITY OF THE INVENTION

As described in detail in the foregoing, the nuclear power generation system according to this invention is constructed to take in a necessary amount of groundwater which is abundant in the underground from an underground dam built nearby, and therefore the system may be installed wherever a suitable groundwater basin exists. As the system does not need pumping up of groundwater, the energy can be utilized at a higher efficiency.

As the nuclear power generation system is built underground in this invention, the system is remarkably superior in earthquake resistance because the influence of S wave (transverse wave) is drastically attenuated compared to an aboveground system.

As the system is built several tens meters below the surface, even if radiation is accidentally produced from the reactor, the concrete walls and impermeable layers in the formations would act as a biological shield, ensuring safety.

Unlike the conventional system, as this system uses groundwater as the secondary cooling water instead of sea water, machines and equipments such as the pipings are less prone to erosion, ensuring a longer life.

Moreover, this system recycles the groundwater to prevent depletion thereof without returning the same to the original groundwater vein after cooling, to prevent groundwater contamination.

I claim:

1. A nuclear power generation system which comprises an underground dam formed with a cutoff wall on groundwater basin, a reactor installed within concrete walls on a bedrock below said underground dam, and an evaporation type cooling tower which houses water piping member for the primary cooling water for said reactor and is connected to a pipe for guiding in the water pooled in said underground dam, and which is so structured that a steam outlet and an air inlet of said cooling tower are respectively communicated with the surface via stacks.

2. A construction method for an underground nuclear power generation system comprising the steps of
   a) exploring a desirable groundwater basin by geological survey,
   b) forming an underground dam by installing a cutoff wall of a predetermined height and length and substantially vertical to faults by pouring in concrete or water glass (sodium silicate) near the outlet of the groundwater basin,
   c) installing a reactor on the bedrock below the underground dam and covering said reactor with a concrete shielding,
   d) installing an evaporation type cooling tower adjacent to the reactor in such a manner that said cooling tower is communicated with the surface through a stack mounted at a steam outlet thereof and through another stack mounted at an air inlet thereof,
   e) guiding the primary cooling water of the reactor and the water pooled in the underground dam into the cooling tower.

* * * * *